INVENTOR
FRANK B. HARLEY

United States Patent Office 3,405,966
Patented Oct. 15, 1968

3,405,966
RELEASABLE FASTENER
Frank Bernard Harley, Egham, England, assignor of one-half to Harley Patents (International) Limited, London, England, a company of Great Britain
Filed Aug. 19, 1966, Ser. No. 573,697
Claims priority, application Great Britain, Aug. 25, 1965, 36,544/65
1 Claim. (Cl. 294—83)

ABSTRACT OF THE DISCLOSURE

A releasable fastener having a pivoted, spring biased slotted catch movable to block an open ended notch in a body to separably hold a member therein. A pivoted locking detent has shoulders that engage the catch to hold it in locked position. A rotary step movable in an aperture in the locking detent may lock or release the locking detent.

---

This invention relates to a releasable fastener of the type comprising a body portion for releasably retaining another part and is concerned with ensuring that inadvertent release of the part cannot occur.

The invention is particularly applicable to fasteners suitable for interconnecting parachutes to heavy military cargoes. It can happen that after the cargo and the parachute have been dropped from an aircraft, but before the parachute is fully open, that there is a danger of a gust of wind or other factor causing the partly opened parachute momentarily to deflate. This and other causes can tend to produce a sudden jarring on the fastener which has been found with prior arrangements to cause inadvertent release of the fastener and the cargo to be released in mid air. Moreover as the cargo and parachute leave the aircraft they may strike a part of it and there is then a risk of similar jarring occurring. The object of the present invention is to provide a construction affording a safeguard to prevent or reduce the risk of such occurrences.

According to the present invention a releasable fastener comprises a body affording an open-ended notch to receive a member adapted to be connected to another part, a retaining catch pivotally carried by the body and movable between a released position in which a limb of it is clear of the notch and a locked position in which the limb bridges the open end of the notch to trap the said member in the notch, a locking detent pivoted to the body and serving to lock the retaining catch in the locked position when moved thereto, and a rotary step movable at will between operative and inoperative positions in which it respectively prevents and permits pivotal movement of the locking detent from its position in which it locks the retaining catch in the locked position.

Preferably the rotary stop is integral with or secured to a rotary member which is arranged to rotate the locking detent.

For example the rotary member and the locking detent have cam and cam follower surfaces which cooperate with one another to cause rotary movement of the locking detent upon rotary movement of the rotary member.

The stop and the cam surface may be external surfaces on the rotary member, whilst the locking detent affords an opening within which the stop lies and the internal periphery of which affords the cam follower.

The invention may be carried into practice in a number of ways but one specific embodiment will now be described by way of example with reference to the accompanying drawings, in which.

Figure 1:
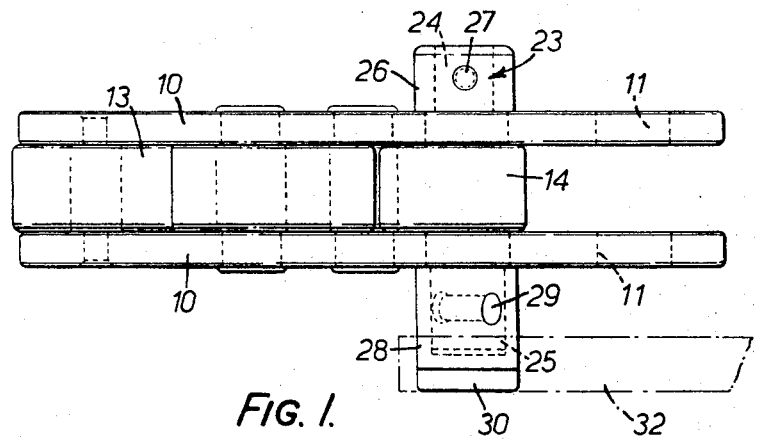
FIGURE 1 is a plan view of a releasable fastener according to the present invention.

The particular arrangement illustrated in the drawings comprises a fastener which serves to interconnect a parachute to a cargo which may for example be a military vehicle which may be of the order of 20,000 lbs. in weight. The fastener comprises a pair of side plates 10 arranged in spaced parallel relationship and having aligned openings 11 by which the fastener as a whole may be connected to the parachute.

Mounted to pivot about transverse pivots between the plates are three members comprising a catch 13, a latch lever 14 and a safety stop 15. The parts 13 and 14 are respectively mounted on transverse fixed pivots 16 and 17 which pass through the side plates 10 and which also serve to maintain the side plates in their spaced relationship. Also extending across between the plates is a transverse pin 18 which, as shown in FIGURES 2 and 3, has surrounding it a coil spring 20, one arm 21 of which engages the catch 13 and the other arm 22 of which engages the latch lever 14.

The safety stop 15 forms an integral part of a transverse rod 23, end portions 24 and 25 of which protrude from opposite sides of the fastener. The end portion 24 is surrounded by a cap 26 secured in place by a rivet 27 whilst the end portion 25 is surrounded by a further end cap 28 secured in position by a rivet 29. The end cap 28 affords a flat 30 by means of which the end cap and hence the rod 23 are keyed to a lever 32 by means of which the rod 23 and hence the safety stop 15 may be rotated.

Figure 2:
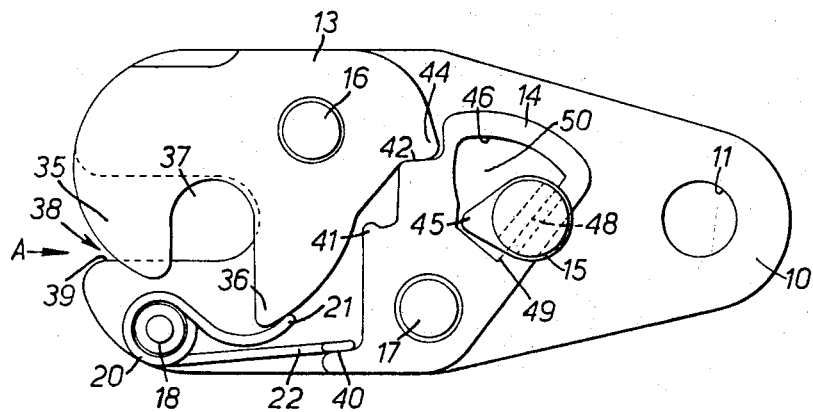
FIGURE 2 is a sectional side elevation of the fastener of FIGURE 1 with one side plate and certain other parts removed.
Figure 3:
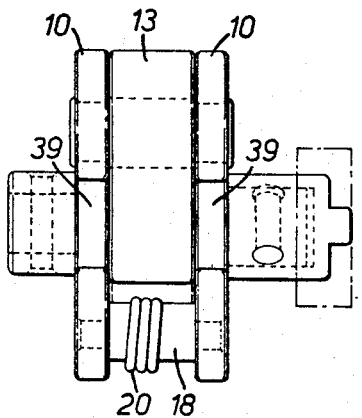
FIGURE 3 is an end elevation of the fastener of FIGURE 2 taken in the direction of the arrow A.

In the position of the catch 13 in FIGURE 2 it will be seen that the catch affords two prongs 35 and 36 forming a fork which affords a recess 37. The prong 35 will be referred to as the forward prong and the prong 36 as the rearward prong. In the position in FIGURE 2 the forward prong 35 extends transversely across a space 38 situated between notches 39 formed in each of the forward ends of the side plates 10. Thus in the position of FIGURE 2 any part extending through the recess 37 and the notches 39 will be entrapped therein. This part may for example be a D-ring by which the cargo to be supported is connected to the fastener.

The latch lever 14 affords three stepped external surfaces 40, 41 and 42 on its forward face the step 40 being engaged by the end of the arm 22 of the spring 20, whilst in the position of FIGURE 2 the stepped surface 42 is engaged by a nose portion 44 at the rear end of the catch 13. Thus, in the position of FIGURE 2, the stepped surface 42 is effectively preventing rotation of the catch 13 about its pivot 16 and so prevents release of any part entrapped within the recess 37.

In order to ensure that the latch lever 14 cannot inadvertently rotate about its pivot 17 to enable the stepped surface 42 to move clear of the nose 44 until required, the safety stop 15 is provided with a protruding portion 45 which passes through an opening 46 formed in the latch lever 14. This opening 46 is so shaped that the safety stop 15 can be rotated from the position of FIGURE 2 to the position of FIGURE 4. In order that the safety stop 15 positively rotates the latch lever 14 to the release position of FIGURE 4 the safety stop is provided with a flat cam surface 48 which engages a correspondingly flat cam follower surface 49 forming part of the internal peripheral of the opening 46. Thus rotation of the lever 32 will cause a clockwise movement of the safety stop in FIGURE 2 and hence will cause the cam 48 to rotate the latch lever 14 away from the catch 13 at the same time as the protruding portion 45 of the safety stop is turned into the widened portion 50 of the opening 46. The rotary movement of the latch lever 14 permitted by rotation of the safety stop disengages the stepped surface 42 from the nose portion 44 and enables the spring 20 to bias the catch 13 clockwise in FIGURE 2 to the position of FIGURE 4, wherein the nose portion 44 engages the other stepped surface 41 of the latch lever. Such rotary movement of the catch 13 will of course be enhanced by any load applied to the part entrapped in the recess 37.

Figure 4:
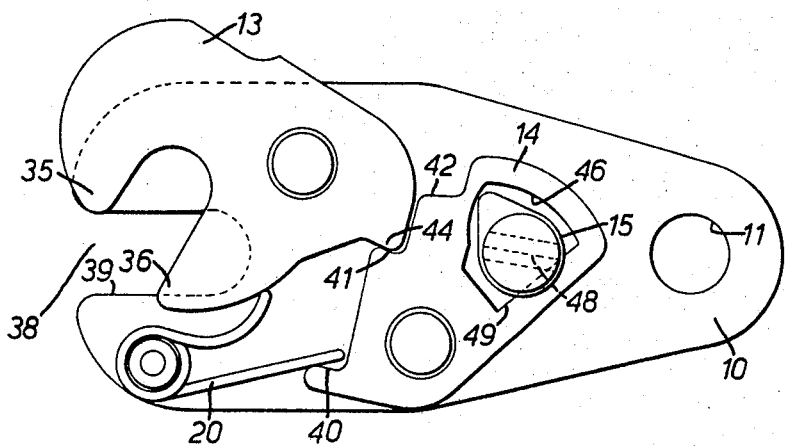
FIGURE 4 is a view similar to FIGURE 2 showing the fastener in the release position.

It is so arranged that the lever 32 is connected either to another mechanism or is spring biassed to ensure that the safety stop 14 cannot move from the FIGURE 2 position to the FIGURE 4 position inadvertently, thereby satisfactorily ensuring a positive locking of the whole mechanism until release is desired. Such release requires a positive movement of the lever 32 both to cause rotation of the latch lever and also to permit it to rotate by movement of the protruding portion 45.

The parts are returned from the FIGURE 4 position to the FIGURE 3 position by insertion of the member to be retained in to the space 38. As it engages the rearward prong 36 it will bias the catch 13 anticlockwise to the FIGURE 2 position and thereafter the spring 20 returns the safety stop 15 and latch lever 14 to the locked position of FIGURE 2.

What I claim as my invention and desire to secure by Letters Patent is:

1. A releasable fastener comprising a body portion for releasably retaining another part, the body portion comprising a pair of spaced plates affording aligned notches together having a longitudinal axis extending in the direction of an intended applied load between the fastener and the other part, the notches being open at one end to receive a member connected to the other part, a forked retaining catch situated between the side plates and pivoted to them, the retaining catch being movable between a released position in which a first limb of it projects into the notches and a locked position to which the catch can be turned by the member entering the notches and engaging the first limb, the other limb in the locked position bridging the open end of the notches to prevent withdrawal of the said member from the notches, a locking detent also situated between the side plates and pivoted to them on the side of the axis remote from the pivot of the retaining catch, and extending substantially transverse to the axis, the locking detent serving to lock the retaining catch in the locked position when moved thereto, and a rotary member mounted on end extending transversely of the side plates with a portion thereof extending through a transverse aperture in the locking detent, the rotary member affording first and second external surface portions, the first external surface portion comprising a stop movable at will by rotation of the rotary member between operative and inoperative positions in which it respectively prevents and permits pivotal movement of the locking detent from the position in which it locks the retaining catch in the locked position, and the second external surface portion comprising a cam arranged to co-operate with a cam follower afforded by the internal peripheral surface of the transverse aperture, co-operation of the cam and cam follower occurring during rotation of the rotary member to move the locking detent.

References Cited
UNITED STATES PATENTS

| | | | |
|---|---|---|---|
| 1,383,252 | 6/1921 | Wearham | 294—83 |
| 2,547,313 | 4/1951 | Gosser | 294—83 X |
| 2,595,450 | 5/1952 | Coffing | 294—83 |
| 2,722,449 | 11/1955 | Harley | 294—83 |
| 2,863,200 | 12/1958 | Miller. | |
| 3,191,984 | 6/1965 | Hanula | 294—83 |

BERNARD A. GELAK, *Primary Examiner.*